United States Patent
Larramendy et al.

[11] Patent Number: 6,044,311
[45] Date of Patent: Mar. 28, 2000

[54] METHOD FOR PROTECTING AN AIRCRAFT AGAINST VERTICAL GUSTS OF WIND AND PITCH-ATTITUDE CONTROL DEVICE EMPLOYING THIS METHOD

[75] Inventors: Panxika Larramendy, Toulouse; Daniel Delgado, Plaisance du Touch, both of France

[73] Assignee: Aerospatiale Societe Nationale Industrielle, Paris, France

[21] Appl. No.: 08/977,754

[22] Filed: Nov. 25, 1997

[30] Foreign Application Priority Data

Dec. 2, 1996 [FR] France .................................. 96 14737

[51] Int. Cl.⁷ ...................................................... G05D 1/08
[52] U.S. Cl. ............................... 701/10; 701/11; 244/175
[58] Field of Search ................................... 701/4, 5, 6, 10, 701/11; 244/175, 194, 195, 196; 340/968

[56] References Cited

U.S. PATENT DOCUMENTS

| | | | |
|---|---|---|---|
| 3,814,912 | 6/1974 | Manke et al. | 235/150.2 |
| 4,043,526 | 8/1977 | Donley et al. | 244/194 |
| 4,092,716 | 5/1978 | Berg et al. | 364/424 |
| 4,314,341 | 2/1982 | Kivela | 364/433 |
| 4,937,571 | 6/1990 | Bonafe | 340/968 |
| 4,967,363 | 10/1990 | Bonafe | 364/427 |
| 5,127,608 | 7/1992 | Farineau et al. | 244/76 R |
| 5,365,446 | 11/1994 | Farineau et al. | 364/433 |
| 5,995,880 | 11/1999 | Larramendy et al. | 701/4 |

FOREIGN PATENT DOCUMENTS 0 322 282   6/1989   European Pat. Off. .

OTHER PUBLICATIONS

"Optimal Guidance during a Windshear Encounter" Scientific Honeyweller, vol. 10, No. 1, Minneapolis pp. 110–116, Jan. 1989.

*Primary Examiner*—Michael J. Zanelli
*Attorney, Agent, or Firm*—Marshall, O'Toole, Gerstein, Murray & Borun

[57] ABSTRACT

A system for protecting an aircraft in cruising flight against excessive load factors when a vertical gust of wind occurs is disclosed. The system has a pitch-attitude flight control system (21) which is under the control of a pilot of the aircraft, an automatic pilot (26), a switch (25) allowing the aerodynamic pitch-attitude control surfaces (22) of the aircraft to be controlled either by the flight control system (21) or by the automatic pilot (26), and a protection system (31) capable of acting on the switch (25) to disconnect the automatic pilot (26) and switch on the flight control system (21). The disconnection of the automatic pilot (26) and the switching-on of the flight control system (21) is delayed by a delay time which is at least approximately equal to a typical duration of a vertical gust of wind, and the switching-on of the flight control system (21) is not carried out unless the gust of wind persists when the delay time has elapsed.

8 Claims, 3 Drawing Sheets

_6,044,311_

METHOD FOR PROTECTING AN AIRCRAFT AGAINST VERTICAL GUSTS OF WIND AND PITCH-ATTITUDE CONTROL DEVICE EMPLOYING THIS METHOD

BACKGROUND OF THE INVENTION

The present invention relates to a method for protecting an aircraft in cruising flight against excessive load factors when vertical gusts of wind occur, and to a device for the pitch-attitude control of an aircraft employing this method.

The vertical gusts of wind to which the present invention relates are swirling turbulence (rather than high-frequency turbulence which causes vibration), generated by swirling rollers of the vortex type, which subject the aircraft passing through or close to them to an upward (or downward) gust of wind and then to a downward (or upward) gust of wind for a few seconds, or alternatively to a succession of upward and downward gusts of wind, if there are a number of vortices.

It is known that commercial aircraft comprise a pitch-attitude flight control system which is under the control of the pilot, an automatic pilot, switching means allowing the aerodynamic pitch-attitude control surfaces (flaps, trim) of said aircraft to be controlled either by said controlled flight control system or by said automatic pilot, and protection means, especially as regards incidence, capable of acting on said switching means to disconnect said automatic pilot and switch on said controlled flight control system, when the angle of incidence, as it increases, reaches an excessively high value.

If the aircraft, in cruising flight with the automatic pilot in operation, encounters an upward gust of wind of this kind, it is firstly subjected to a high positive load factor. The automatic pilot reacts to the variations in longitudinal pitch attitude, but its authority is limited, which means that its reaction is weak and it becomes disconnected by the action of said protection means and of said switching means as soon as the angle of incidence reaches a protection threshold. Control is then by means of the controlled flight control system which generates a strong order to nose down in order to reduce the angle of incidence and counter the effect of the upward wind. However, the gust then changes direction and the wind becomes a downward gust, which means that now the pilot's nose-down action is added to the downward gust of wind and applies a negative load factor on the aircraft, this load factor being even higher than the factor that would result from the gust itself. This may result in injury to passengers and damage to the aircraft.

A similar process occurs if the aircraft was being flown manually when said gust occurred.

Of course, what has been described hereinabove applies mutatis mutandis to the case where a downward then upward gust of wind is encountered.

Thus, from the foregoing, it will be readily understood that in general, any control action to counter a gust of wind produces its effect at the moment said gust changes direction, which means that this control action unfavorably increases the already high load factor to which the said gust is subjecting the aircraft.

SUMMARY OF THE INVENTION

The object of the present invention is to overcome this drawback and to improve the behavior and control of the aircraft in the presence of vertical gusts of wind.

To this end, according to the invention, the method for protecting an aircraft in cruising flight against excessive load factors when vertical gusts of wind occur, said aircraft comprising the pitch-attitude control systems described hereinabove, is noteworthy in that the disconnection of said automatic pilot and the switching-on of said controlled flight control system are delayed by a delay time which is at least approximately equal to the usual duration of the most frequently encountered vertical gusts of wind and this disconnection and this switching-on are not carried out unless the gust persists when said delay time has elapsed.

The present invention is based on the fact that because one can never tell when a vertical gust of wind is going to change direction, the best thing to do, in an attempt to limit the load factors applied to the aircraft, is to avoid countering the gust and to keep the automatic pilot in operation because it is the automatic pilot that has the weakest reactions and whose behavior is therefore most appropriate in the presence of gusts.

Experience has shown that the most frequently encountered gusts of wind usually last for of the order of 3 seconds, and this means that it is this value which is advantageously given to said delay time.

Thus, thanks to the present invention, on the one hand the load factors applied to the aircraft are reduced and, on the other hand, the switching between the automatic pilot and the controlled flight control system takes place only for vertical gusts of wind which last for longer than 3 seconds, and this considerably reduces the number of such switching operations.

From the foregoing, it will be understood that according to the invention, a device for the pitch-attitude control of an aircraft comprising a stick system available to the pilot, a pitch-attitude flight control system receiving pitch-attitude control commands from said stick system and generating pitch-attitude control commands for the aerodynamic pitch-attitude control surfaces, an automatic pilot, switching means sending to said aerodynamic surfaces either the pitch-attitude control commands formulated by said flight control system, or pitch-attitude control commands formulated by said automatic pilot, and protection means capable of acting on said switching means to disconnect said automatic pilot and switch on said controlled flight control system, is noteworthy in that it comprises means which, in cruising flight with the automatic pilot in operation, delay the switching between said automatic pilot and said controlled flight control system by a delay time which is at least approximately equal to the usual duration of the most frequent vertical gusts of wind and which does not carry out this switching unless the gust persists when said delay time has elapsed.

It will be noted that despite said delay means (for example of the filter type), operations of switching between automatic pilot and manual control will take place, either because a gust lasts for longer than said delay time, or because the pilot acts instinctively on the stick system in order to counter a gust. However, since according to the invention said switching takes place later, it may happen that in violent gusts, with the automatic pilot remaining in operation, the aircraft experiences substantial variations in altitude that force the pilot to act on the stick (and therefore to disconnect the automatic pilot) in order to make up the altitude that the aircraft had before the gust.

Also, according to another aspect of the present invention, the proposal is for the presence of a vertical gust of wind to be detected and the control device above to be improved, on the one hand, to avoid the pilot being tempted to act on the stick and, on the other hand, to improve the control of the aircraft, if switching between automatic pilot and manual control has taken place.

Also, the control device according to the invention is noteworthy in that, in addition, it comprises a device for detecting vertical gusts of wind, comprising:

subtracting means receiving the first differential with respect to time of the current incidence and the first differential with respect to time of the current pitch attitude of the aircraft and delivering on their output the absolute value of the difference between said differentials;

first comparison means for comparing said absolute value to an upper threshold and for delivering a signal if said absolute value is above said upper threshold;

second comparison means for comparing the current Mach number of the aircraft to a Mach number threshold and for delivering a signal if said current Mach number is above said Mach number threshold; and first logic means of the AND type receiving, respectively, on their inputs:
said signal resulting from the comparison of said absolute value with said upper threshold;
said signal resulting from the comparison of said current Mach number with said Mach number threshold; and
a signal which represents the fact that the aero-dynamic flaps and slats of said aircraft are in the clean configuration, said first logic means delivering on their output a signal which represents the presence of vertical gusts of wind.

Advantageously, said device for detecting gusts receives measurements of the incidence and of the pitch attitude which are available on board the aircraft, and it comprises differentiation means for calculating said first differentials.

As a preference, said detection device comprises:

third comparison means for comparing said absolute value with a threshold lower than said upper threshold and for delivering a signal if said absolute value is below said lower threshold; and second logic means inserted between said first comparison means and said first logic means, said second logic means receiving on their inputs said signals resulting from the comparisons of said absolute value with said thresholds and delivering to said first logic means:
either no signal, if said signal resulting from the comparison of said absolute value with said lower value exists;
or said signal resulting from the comparison of said absolute value with said upper threshold, as long as said absolute value is above said lower threshold.

Thanks to a detection device of this kind, it is possible to improve the control device in the way mentioned above.

Thus, according to one embodiment of the control device in accordance with the present invention, this device additionally comprises:

an auxiliary automatic pilot generating strengthened pitch-attitude control commands, at least as regards commands to climb;

a first controlled switch placed between said automatic pilots on the one hand, and said switching means on the other hand, and capable of sending to these either the pitch-attitude control commands from said automatic pilot, or the pitch-attitude control commands from said auxiliary automatic pilot, and said device for detecting vertical gusts of wind controls said first controlled switch so that said strengthened pitch-attitude control commands are sent to said aerodynamic surfaces at the end of said gusts if said automatic pilot has not been disconnected with a delay by said switching means.

Thus, when the main automatic pilot has remained engaged during the vertical gust of wind, in order to make good as quickly as possible the variations in altitude that have occurred as a result of said gust (and thus avoid the pilot being tempted to revert to manual control after the turbulence in an attempt to maintain altitude), the auxiliary automatic pilot is switched on, in place of said main automatic pilot, by the action of said first controlled switch. For a few seconds (for example 20 seconds) the auxiliary automatic pilot, with increased authority (for example twice that of the main automatic pilot) acts to make the aircraft rapidly (twice as quickly as in the earlier example) regain the altitude it had before the gust.

According to yet another aspect of the present invention, the control device also comprises:

a controlled auxiliary flight control system receiving said pitch-attitude control commands from said stick system and generating pitch-attitude control commands which are limited at least as far as commands to nose down are concerned;

a second controlled switch placed between said controlled flight control systems on the one hand, and said switching means on the other hand, and able to send to these either the pitch-attitude control commands from said flight control system, or the limited pitch-attitude control commands from said auxiliary flight control system, and said device for detecting vertical gusts of wind controls said second controlled switch so that said limited pitch-attitude control commands are sent to said aerodynamic surfaces during such vertical gusts of wind once said automatic pilot has been disconnected.

Thus, if the automatic pilot was disconnected either by action of said protection means or by action of the pilot on the stick, the deliberate pitch-attitude control commands from the pilot are limited, and this avoids the load factors resulting from the gust being increased.

DESCRIPTION OF THE DRAWINGS

The figures of the appended drawing will make it easy to understand how the invention can be achieved. In these figures, identical references denote similar elements.

DETAILED DESCRIPTION OF THE PREFERRED EMBODIMENT

Figure 1:
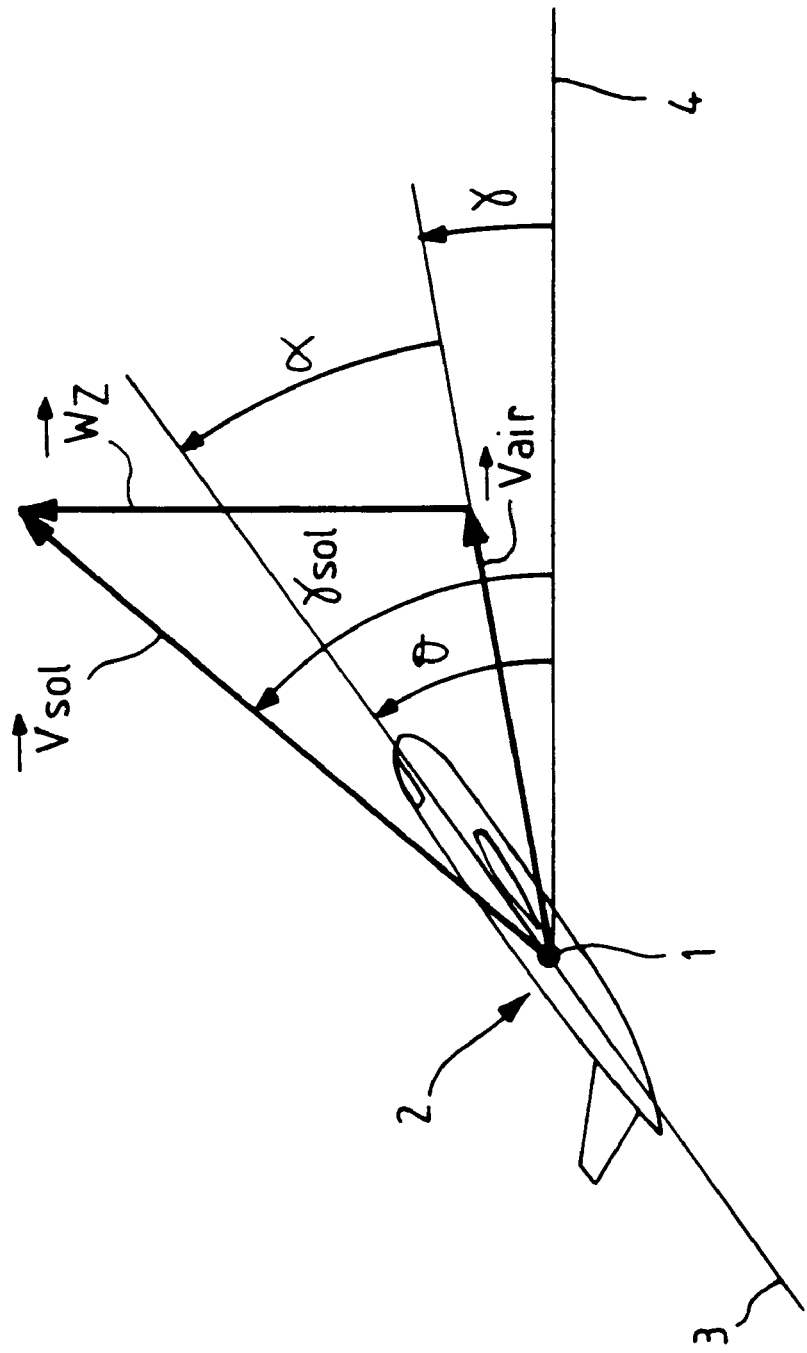
FIG. 1 is a diagram of the speeds of an airplane in flight.

FIG. 1 depicts the diagram of the speeds applied to the center of gravity 1 of an airplane 2 in climbing flight, encountering an upward vertical gust of wind. In this FIG. 1, the longitudinal axis 3 of the airplane 2 is inclined by the pitch attitude $\theta$ with respect to the line 4 of the horizon and has an incidence $\alpha$ with respect to the aerodynamic speed V $\vec{air}$ which, itself, is inclined by the aerodynamic slope $\gamma$ with respect to said horizon line 4. The speed $\vec{Wz}$ of the upward vertical wind combines with said speed $\vec{Vair}$ to make up the speed $\vec{V}_{sol}$ of said airplane 2 with respect to the ground, this speed $\vec{V}_{sol}$ being inclined by the slope $\gamma_{sol}$ with respect to the horizon line 4.

It may readily be seen that: $\gamma_{sol} = \gamma + (Wz)/V_{air}$, if the lengths of the vectors $\vec{Wz}$ and $\vec{V}_{air}$ are called $Wz$ and $V_{air}$ respectively.

Incidentally, $\gamma = \theta - \alpha$ which means that $$\gamma_{sol} = \theta - \alpha + (Wz)/V_{air}.$$

Given, as explained above, that we are attempting, according to the invention, to improve the behavior of the airplane in cruising flight, it is possible to dispense with measuring $\gamma_{sol}$ and consider that this is zero. Thus, $$(Wz)/V_{air} = \alpha - \theta$$

If we consider instantaneous variations in wind $\delta/\delta t(Wz/V_{air})$, we can see that with the assumption made above, these variations are equal to $\dot\alpha - \dot\theta$, which represents the difference between the first differentials with respect to time of the current incidence $\alpha$ and of the current pitch attitude $\theta$ of the airplane 2.

In accordance with the present invention, instantaneous variations in wind are therefore determined by measuring said difference $\dot\alpha - \dot\theta$. In order to be able to detect both positive (upward) and negative (downward) instantaneous variations in wind, what is actually measured is the absolute value $|\dot\alpha - \dot\theta|$ of said difference and this is compared to a gust detection threshold $S_s$. A threshold $S_s$ of this kind is expressed in degrees angle per second and may for example be approximately equal to 1°/s.

Thus, if $|\dot\alpha - \dot\theta|$ is above $S_s$, the airplane 2 is considered to be subject to a vertical gust of wind.

Figure 2:
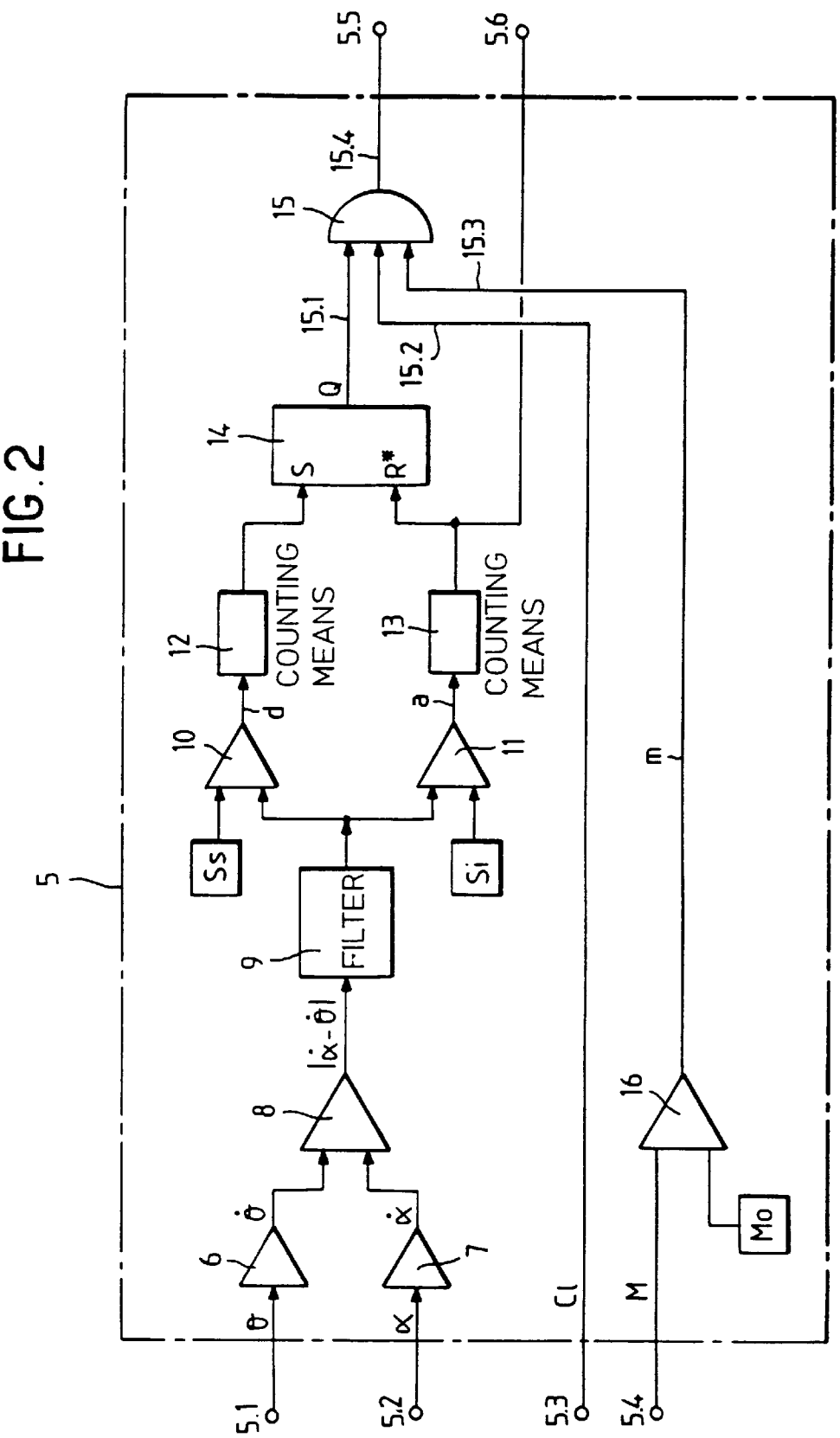
FIG. 2 is the block diagram of one embodiment of the device for detecting vertical gusts of wind, in accordance with the present invention.

FIG. 2 depicts the block diagram of a detector 5 of vertical gusts of wind in accordance with the present invention. This detector 5 is mounted on board the airplane 2 and has four inputs 5.1 to 5.4 and two outputs 5.5 and 5.6.

The current pitch attitude $\theta$ and the current incidence $\alpha$ of the aircraft 2 are applied to the inputs 5.1 and 5.2 respectively. Differentiators 6 and 7 respectively give the first differentials with respect to time $\dot\theta$ and $\dot\alpha$ of the current pitch attitude $\theta$ and of the current incidence $\alpha$. A subtractor 8 to which said differentials are applied finds out the difference between them and delivers its absolute value, namely $|\dot\alpha - \dot\theta|$, on its output. In order to eliminate measurement noise and avoid false detections of vertical gusts of wind, this absolute value is sent to a filter 9.

At the output of the filter 9, the filtered absolute value $|\dot\alpha - \dot\theta|$ is sent to two comparators 10 and 11. In comparator 10, said filtered absolute value is compared with the upper threshold $S_s$, which for example is equal to 1°/s, while in the comparator 11 it is compared with a lower threshold $S_i$, for example equal to 0.5°/s.

If, and only if, said filtered absolute value is:
  above the upper threshold $S_s$, the comparator 10 emits on its output a signal d that vertical gusts of wind have been detected;
  below the lower threshold $S_i$, the comparator 11 emits on its output a signal a that there are no vertical gusts of wind.

Counting means 12 and 13 measure the duration of the signals d and a and send them to a flipflop 14, of the RS type, if they last long enough. For example, the signal d is sent to the S input of the flipflop 14, if it lasts at least 200 ms, while the signal a is sent to the R* input of the flipflop 14, if it lasts at least 1 s. The Q output of the flipflop 14 is connected to one of the inputs 15.1 of a gate 15 of the three-input AND type, the output 15.4 of which forms the output 5.5 of the detector 5. The other output 5.6 of said detector is connected to the R* input of said flipflop 14.

A signal cl which represents the fact that the airplane 2 is in the clean configuration, that is to say that none of its flaps or slats is deployed, is applied to the input 5.3 of the detector 5. The input 5.3 is connected to the input 15.2 of the gate 15.

Incidentally, the input 5.4 of the detector 5 receives the current Mach number M of the airplane 2. This current Mach number M is compared, in a comparator 16, with a Mach number threshold Mo, for example equal to 0.53. The output of the comparator 16 is connected to the input 15.3 of the AND gate and sends a signal m thereto only if the current Mach number M is above the threshold Mo.

The way in which the detector 5 in accordance with the invention and shown in FIG. 2 works is as follows:

A - Cruising flight with no vertical gusts of wind

With the airplane 2 in cruising flight, its configuration is smooth and its Mach number is above Mo. There are therefore signals on the inputs 15.2 and 15.3 of the AND gate.

Moreover, as there are no vertical gusts of wind, the absolute value $|\dot\alpha - \dot\theta|$, filtered by the filter 9, is below the threshold $S_i$, which means that the signal d does not exist and that the signal a, confirmed in terms of duration by the counting means 13, is applied to the R* input of the flipflop 14 and to the output 5.6 of the detector 5. There is therefore no signal on the Q output of the flipflop 14.

Thus in this case, there is no signal on the input 15.1 of the AND gate 15, and no signal appears on the output 5.5 of the detector 5.

B - Cruising flight as a vertical gust of wind occurs

If now a vertical gust of wind appears, the filtered absolute value $|\dot\alpha - \dot\theta|$ becomes higher than the threshold $S_s$, which means that the signal d, confirmed in terms of duration by the counting means 12, is applied to the S input of the flipflop 14 and that the signal a disappears. The Q output therefore emits an output signal which is sent to the input 15.1 of the gate 15. As there are signals on the other two inputs 15.2 and 15.3 as described above, the AND gate becomes active and a signal that vertical gusts of wind are present appears on the output 5.5 of the detector 5.

C - Cruising flight as a vertical gust of wind disappears

If the vertical gust of wind disappears: first of all, the filtered absolute value $|\dot\alpha - \dot\theta|$ drops below the threshold $S_s$, but remains above the threshold $S_i$, which means that the signals d and a are both zero. This means that the Q output remains unchanged and continues to emit its output signal and that the signal that a vertical gust of wind is present therefore continues to be present on the output 5.5 of the detector 5;

next, the filtered absolute value $|\dot\alpha - \dot\theta|$ drops below the threshold $S_i$, so that the signal a appears and is applied to the R* input. The gate 15 therefore emits no signal on its Q output and the airplane 2 returns to the condition it was in before the vertical gust of wind occurred.

Figure 3:
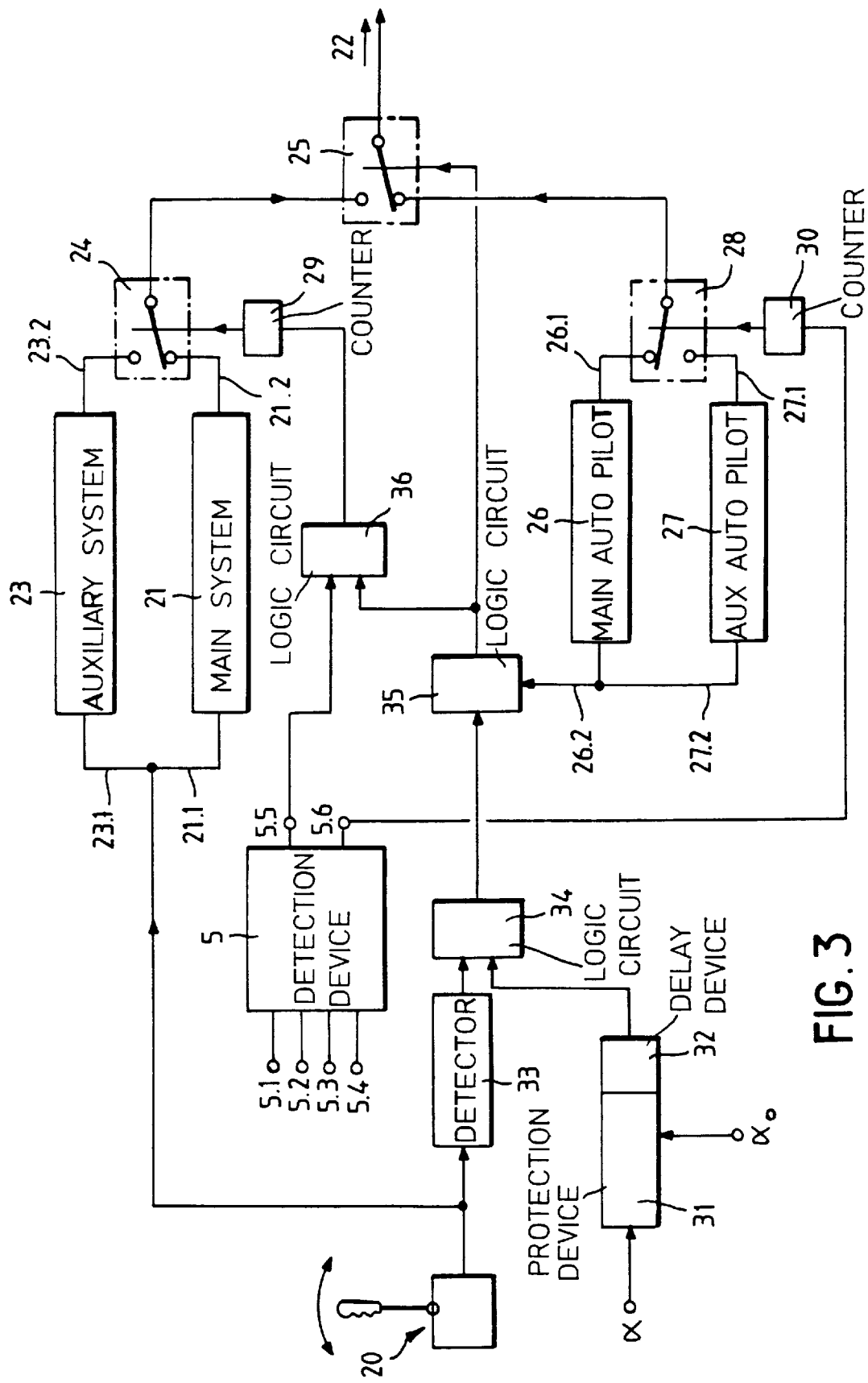
FIG. 3 is the block diagram of an embodiment of the device for the pitch-attitude control of an airplane, in accordance with the present invention.

FIG. 3 depicts a device according to the invention for the pitch-attitude control of the aircraft 2. This control device comprises:
  a stick system 20 available to the pilot for generating pitch-attitude control commands, especially commands to nose down;

a main flight control system 21 receiving, on its input 21.1, said pitch-attitude control commands from said system 20 and generating on its output 21.2 pitch-attitude control commands for aerodynamic pitch-attitude control surfaces 22 (not depicted in detail);

an auxiliary flight control system 23 receiving, on its input 23.1 (just like the main flight control system 21), said pitch-attitude control commands from said stick system 20 and generating, on its output 23.2, pitch-attitude control commands which are limited at least as regards the commands to nose down;

a controlled switch 24 placed between the flight control systems 21 and 23 on the one hand, and said aerodynamic surfaces 22 on the other hand, said switch 24 being capable of connecting to these surfaces via switching means 25 either the output 21.2 or the output 23.2;

a main automatic pilot 26 capable of emitting on its output 26.1 pitch-attitude control commands for the aerodynamic surfaces 22 and on its output 26.2 a signal that represents its state of activity;

an auxiliary automatic pilot 27 capable of emitting on its output 27.1 pitch-attitude control commands with greater (for example twice as much) authority than said main automatic pilot 26 and, on its output 27.2, connected to said output 26.2 of the latter, a signal which represents its state of activity;

a controlled switch 28 placed between the automatic pilots 26 and 27 on the one hand, and the aerodynamic surfaces 22 on the other hand, said switch 28 being capable of connecting to these surfaces, via said switching means 25, either the output 26.1 or the output 27.1;

the detection device 5 controlling said switch 24 by its output 5.5 via a counter 29 and controlling said switch 28 by its output 5.6 via a counter 30;

an incidence protection device 31 receiving the current incidence a and comparing it with a protection threshold α to generate a protection signal when said threshold is exceeded;

a delay device 32, for example of the filter type, placed at the output of the protection device 31 to delay said protection signal;

a detector 33 that the stick system 20 is being operated, this detector being connected to this stick system and emitting a signal when the pilot operates said stick system 20;

a logic circuit 34 of the OR gate type, receiving the two signals from the delay device 32 and from the detector 33;

a logic circuit 35 of the AND gate type, receiving the output signal from the logic circuit 34 and the activity signal appearing on the common outputs 26.2 and 27.2 of the main automatic pilot 26 and of the auxiliary automatic pilot 27; and a logic circuit 36 of the AND gate type, receiving the signal appearing on the output 5.5 of the detector 5 and the signal appearing on the output of the logic circuit 35.

Incidentally, the output of the logic circuit 35 controls the switching means 25, while the output of the logic circuit 36 controls the controlled switch 27, via the counter 29.

In cruising flight, when the automatic pilot 26 is in operation, the switching means 25 and the switches 24 and 28 are in the positions illustrated in FIG. 3.

When a vertical gust of wind occurs it is detected by the detector 5 and by the incidence protection device 31. A number of processes may then occur:

A/ If the duration of said gust is shorter than the delay imposed by the device 32 and if the pilot does not operate the stick system 20, said gust has disappeared when the device 32 becomes active, which means that no signal is sent to the OR gate 34. The AND gate 35 receives only the signal from the output 26, which means that the switching means 25 and the switch 24 do not switch and remain in their previous positions. The aerodynamic surfaces 22 therefore stay controlled by the main automatic pilot 26 via the switch 28 and the switching means 25. When the gust disappears, the signal emitted on the output 5.6 of the detector 5 causes the switch 28 to flip, which means that from this moment on, said aerodynamic surfaces 22 are controlled by the auxiliary automatic pilot 27 which has strengthened authority. After a time which is fixed by the counter 30 (for example 20 seconds), the switch 28 flips back and control is again provided by the main automatic pilot 26.

B/ If the duration of the gust exceeds the delay imposed by the device 32 or if the pilot operates the stick system 20, there are signals on the two inputs of the AND gate 35, and on the two inputs of the AND gate 36. This means that the switch 24 and the switching means 25 flip so that it is now the auxiliary system 23 with limited authority which, under the control of the stick system 20, operates the aerodynamic surfaces for nosing down 22.

If the vertical gust of wind disappears, the detection system 5 makes the switch 24 flip back so that the aerodynamic surfaces 22 are then operated by the main system 21.

Thanks to the counter 29, the above process may for example be as follows: when a gust is detected for less than six seconds, the auxiliary system 23 is rendered active for at least 10 seconds. If the gust disappears, the main system 21 is again rendered active, if the gust has been gone for more than 4 seconds and if the stick 20 has not been activated to nose down in at least the last second, in order to avoid any discontinuity in authority at the stick liable to encourage aircraft pilot coupling.

Of course, the above process is merely one of many examples. In general, limiting the pitch-attitude control commands generated by the auxiliary flight control system 23 needs to be a compromise between:

reducing the authority to nose down as far as possible in order to reduce as far as possible the risk of excessive load factors; and leaving the pilot enough authority to nose down to allow him to avoid another airplane in a turbulent atmosphere.

Although the auxiliary flight system 23 and the auxiliary automatic pilot 27 have been depicted above as being independent of the main flight system 21 and of the main automatic pilot 26 respectively, it goes without saying that they could form part of these respective devices.

What is claimed is:

1. A system for protecting an aircraft in cruising flight against excessive load factors when a vertical gust of wind occurs, said aircraft having a plurality of aerodynamic pitch-attitude control surfaces (22), said system comprising:

a pitch-attitude flight control system (21) which is under the control of a pilot of the aircraft;

an automatic pilot (26);

switching means (25) allowing said aerodynamic pitch-attitude control surfaces (22) of said aircraft to be controlled either by said flight control system (21) or by said automatic pilot (26); and protection means (31) capable of acting on said switching means (25) to disconnect said automatic pilot (26) and switch on said flight control system (21), said disconnection of said automatic pilot (26) and said switching-on of said flight control system (21) being delayed by a delay time which is at least approximately equal to a typical duration of a vertical gust of wind and said switching-on of said flight control system (21) not being carried out unless said gust of wind persists when said delay time has elapsed.

2. The system as claimed in claim 1, wherein said delay time is of the order of three seconds.

3. A device for the pitch-attitude control of an aircraft having a plurality of aerodynamic pitch-attitude control surfaces (22), said device comprising:

a stick system (20) available to a pilot of the aircraft;

a pitch-attitude flight control system (21) receiving pitch-attitude control commands from said stick system (20) and generating pitch-attitude control commands for the aerodynamic pitch-attitude control surfaces (22);

an automatic pilot (26);

switching means (25) sending to the aerodynamic surfaces (22) either the pitch-attitude control commands formulated by said flight control system (21) or pitch-attitude control commands formulated by said automatic pilot (26);

protection means (31) capable of acting on said switching means (25) to disconnect said automatic pilot (26) and switch on said flight control system (21); and delay means (32) which, in cruising flight with the automatic pilot in operation, delays the switching between said automatic pilot (26) and said flight control system (21) by a delay time which is at least approximately equal to a typical duration of a vertical gust of wind, said switching not being carried out unless said gust of wind persists when said delay time has elapsed.

4. The control device as claimed in claim 3, additionally comprising a device (5) for detecting a vertical gust of wind, said device (5) comprising:

subtracting means (8) receiving a first time differential ($\dot{\alpha}$) of a current incidence ($\alpha$) and a first time differential ($\dot{\theta}$) of a current pitch attitude ($\theta$) of the aircraft and delivering on an output an absolute value ($|\dot{\alpha}-\dot{\theta}|$) of a difference between said differentials;

first comparison means (10) for comparing said absolute value to an upper threshold (Ss) and for delivering a signal (d) if said absolute value is above said upper threshold (Ss);

second comparison means (16) for comparing a current Mach number (M) of the aircraft to a Mach number threshold (Mo) and for delivering a signal (m) if said current Mach number is above said Mach number threshold; and first logic means (15) of the AND type receiving on a first input said signal (d) resulting from the comparison of said absolute value with said upper threshold, receiving on a second input said signal (m) resulting from said comparison of said current Mach number with said Mach number threshold (Mo), and receiving on a third input a signal (c1) which represents that said aerodynamic flaps and slats of said aircraft are in a clean configuration, said first logic means (15) delivering on an output (15.4) a signal which represents the presence of a vertical gust of wind.

5. The control device as claimed in claim 4, wherein said detection device (5) additionally comprises differentiation means (6, 7) receiving signals that represent the current pitch attitude ($\theta$) and the current incidence ($\alpha$) and delivering on an output said first differentials ($\dot{\alpha}$ and $\dot{\theta}$).

6. The control device as claimed in claim 4, wherein said detection device (5) additionally comprises:

third comparison means (11) for comparing said absolute value with a threshold (Si) lower than said upper threshold (Ss) and for delivering a signal (a) if said absolute value is below said lower threshold (Si); and second logic means (14) inserted between said first comparison means (10) and said first logic means (15), said second logic means (14) receiving said signals (d) and (a) resulting from said comparisons of said absolute value with said thresholds and delivering to said first logic means (15):

either no signal, if said signal (a) resulting from the comparison of said absolute value with said lower value exists;

or said signal (d) resulting from the comparison of said absolute value with said upper threshold, as long as said absolute value ($|\dot{\alpha}-\dot{\theta}|$) is above said lower threshold (Si).

7. The control device as claimed in claim 4, additionally comprising:

an auxiliary automatic pilot (27) generating strengthened pitch-attitude control commands;

a first controlled switch (28) placed between said automatic pilots (26 and 27) and said switching means (25) which sends either the pitch-attitude control commands from said automatic pilot (26), or the pitch-attitude control commands from said auxiliary automatic pilot (27), and wherein said device (5) for detecting a vertical gust of wind controls said first controlled switch (28) so that said strengthened pitch-attitude control commands are sent to said control surfaces (22) at the end of said gust of wind if said automatic pilot (27) has not been disconnected with a delay by said switching means (25).

8. The control device as claimed in claim 4, which additionally comprises:

a controlled auxiliary flight control system (23) receiving said pitch-attitude control commands from said stick system (20) and generating pitch-attitude control commands;

a second controlled switch (24) placed between said flight control systems (21, 23) and said switching means (25) and which send either the pitch-attitude control commands from said flight control system (21), or the limited pitch-attitude control commands from said auxiliary flight control system (23), and wherein said device (5) for detecting a vertical gust of wind controls said second controlled switch (24) so that said limited pitch-attitude control commands are sent to said control surfaces (22) during a vertical gust of wind once said automatic pilot (26) has been disconnected.

* * * * *